United States Patent [19]

Flores et al.

[11] Patent Number: 5,564,018

[45] Date of Patent: Oct. 8, 1996

[54] SYSTEM FOR AUTOMATICALLY DISTRIBUTING SELECTED MAIL ITEM TO SELECTED USER ASSOCIATED WITH OFFICE LOCATION WITHIN PHYSICAL OFFICE FLOOR PLAN IN DATA PROCESSING SYSTEM

[75] Inventors: David Flores, Keller; William J. Johnson, Flower Mound; Lawrence M. Lachman; Michael D. Smith, both of Irving; Guillermo Vega-Toro, Grapevine, all of Tex.

[73] Assignee: International Business Machines Corporation, Armonk, N.Y.

[21] Appl. No.: 152,756

[22] Filed: Nov. 15, 1993

[51] Int. Cl.$^6$ .................................................. G06F 13/00
[52] U.S. Cl. ................ 395/200.02; 358/402; 364/222.2; 364/284.3; 364/284.4; 364/DIG. 1
[58] Field of Search ..................................... 395/200, 153, 395/156, 157, 159, 200.02; 345/118, 119, 149, 156; 358/402; 370/110.1; 379/100

[56] References Cited

U.S. PATENT DOCUMENTS

| | | | |
|---|---|---|---|
| 5,125,675 | 6/1992 | Goodale et al. | 395/200.16 |
| 5,355,447 | 10/1994 | Knowlton | 395/139 |
| 5,379,340 | 1/1995 | Overend et al. | 379/93 |
| 5,408,333 | 4/1995 | Kojima et al. | 358/400 |
| 5,418,908 | 5/1995 | Keller et al. | 395/200.01 |
| 5,424,724 | 6/1995 | Williams et al. | 370/94.1 |

OTHER PUBLICATIONS

"OCE opens new worlds", by Ratcliffe, Mitch, Feb. 92, MacWeek, v6, n6, p1(2).

"Unix Management Puts on a happy face", by Mary Jander, Dec. 91, Data Communication, p. 131, vol. 20, No. 17.

"E–Mail from the workplace shell", by Jon Udell, Mar. 93, Byte, p. 142, vol 18, No. 3.

"Mail 2.0", by Rizzo, John, Jan. 93, MacUser, v9, n1, p52(2).

*Primary Examiner*—Thomas C. Lee
*Assistant Examiner*—Moustafa Mohamed Meky
*Attorney, Agent, or Firm*—Edward H. Duffield; Andrew J. Dillon

[57] ABSTRACT

A method and system for the efficient distribution of electronic mail items within a distributed data processing system having multiple users enrolled therein wherein each user utilizes a computer or terminal device having a unique address. After selecting an individual electronic mail item for distribution an intuitive graphic representation of a group of unique addresses is displayed within a user's terminal device. The intuitive graphic representation may take one of several forms including a two or three dimensional graphic representation of an office floor plan which identifies the occupants of each office, or a photographic image of one or more users. In response to a graphic selection by the user of a particular graphic representation, or portion thereof, an identified electronic mail item is then automatically distributed to the user whose unique address is associated with that graphic representation or portion thereof. In one embodiment an electronic mail item is displayed as a miniature graphic representation or "icon" and is thereafter automatically distributed in response to a relocation of that icon to a position overlying the graphic representation or portion thereof, utilizing well known "drag and drop" techniques.

2 Claims, 4 Drawing Sheets

SYSTEM FOR AUTOMATICALLY DISTRIBUTING SELECTED MAIL ITEM TO SELECTED USER ASSOCIATED WITH OFFICE LOCATION WITHIN PHYSICAL OFFICE FLOOR PLAN IN DATA PROCESSING SYSTEM

BACKGROUND OF THE INVENTION

1. Technical Field

The present invention relates in general to an improved data processing system and in particular to an improved method and system for efficiently distributing electronic mail items within a distributed data processing system. Still more particularly, the present invention relates to an improved method and system for graphically distributing electronic mail items within a distributed data processing system.

2. Description of the Related Art

In the modern office environment electronic mail is rapidly supplanting traditional forms of communication. Files, notes, meeting notices, message and documents are often sent from one user to another user within a distributed data processing system in ever increasing numbers as managers attempt to decrease the amount of so-called "float" associated with traditional mail systems. While modern electronic mail systems are increasingly accepted by users familiar with computer technology, the number of users having only minimal computer expertise being exposed to such systems is also increasing.

While users familiar with electronic mail systems are familiar with user identifications, distribution lists, network nodes, gateways, call-up services, and the like, an inexperienced computer user is often confused by the complexity of such systems. In a typical electronic mail environment, the address to which a note, message or document is to be transmitted is typically a combination of an identification of a particular user and an identification of a particular system or node within a system. Thus, a user wishing to send a note or message utilizing electronic mail must know or have available the destination address for each prospective addressee, a sometimes complex and burdensome aspect of these systems.

Several techniques have been proposed for minimizing the complexity of addressing electronic mail items including systems which permit the utilization of so-called "nicknames" wherein a user enters a user identification and system identification for those individuals who are frequently addressed by that user and assigns a simple "nickname" which corresponds to that destination address. Thereafter, the user may address a note or message utilizing the electronic mail system to that particular user by simply entering the "nickname" of that user. While this approach does minimize some of the complexity of transmitting an electronic mail item throughout a distributed data processing system, it is still necessary that the user obtain the correct user identification and system identification for the user and then be able to recall from memory the "nickname" for that user.

Additionally, some systems exist which permit the user to perform an electronic search for the address associated with a particular prospective recipient of an electronic mail item by searching for that individual within a listing of all users of the system. Such systems typically require the user to be able to spell the name of the prospective recipient and know that prospective recipient's first name and initials in the event that multiple users within the system share a particular last name. Additionally, such systems often permit a so-called "fuzzy" search, when the user is uncertain with regard to the accurate spelling of the recipient's last name.

While each of the aforementioned systems provides a method whereby the user of an electronic mail system may diminish the burden typically associated with obtaining the correct user identification and system identification for all prospective electronic mail addressees, the technical level of complexity involved in each of these approaches is still somewhat confusing to the inexperienced computer user.

It should therefore be apparent that it would be advantageous to provide a system whereby the distribution of electronic mail items within a distributed data processing system may occur in an intuitive and graphic manner, alleviating the concern of inexperienced users as to the necessity for accurate representation of the destination address of a recipient.

SUMMARY OF THE INVENTION

It is therefore one object of the present invention to provide an improved data processing system.

It is another object of the present invention to provide an improved method and system for efficiently distributing electronic mail items within a distributed data processing system.

It is yet another object of the present invention to provide an improved method and system for graphically distributing electronic mail items within a distributed data processing system.

The foregoing objects are achieved as is now described. The method and system of the present invention may be utilized for the efficient distribution of electronic mail items within a distributed data processing system having multiple users enrolled therein wherein each user utilizes a computer or terminal device having a unique address. After selecting an individual electronic mail item for distribution an intuitive graphic representation of a group of unique addresses is displayed within a user's terminal device. The intuitive graphic representation may take one of several forms including a two or three dimensional graphic representation of an office floor plan which identifies the occupants of each office, or a photographic image of one or more users. In response to a graphic selection by the user of a particular graphic representation, or portion thereof, an identified electronic mail item is then automatically distributed to the user whose unique address is associated with that graphic representation or portion thereof. In one embodiment an electronic mail item is displayed as a miniature graphic representation or "icon" and is thereafter automatically distributed in response to a relocation of that icon to a position overlying the graphic representation or portion thereof, utilizing well known "drag and drop" techniques.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
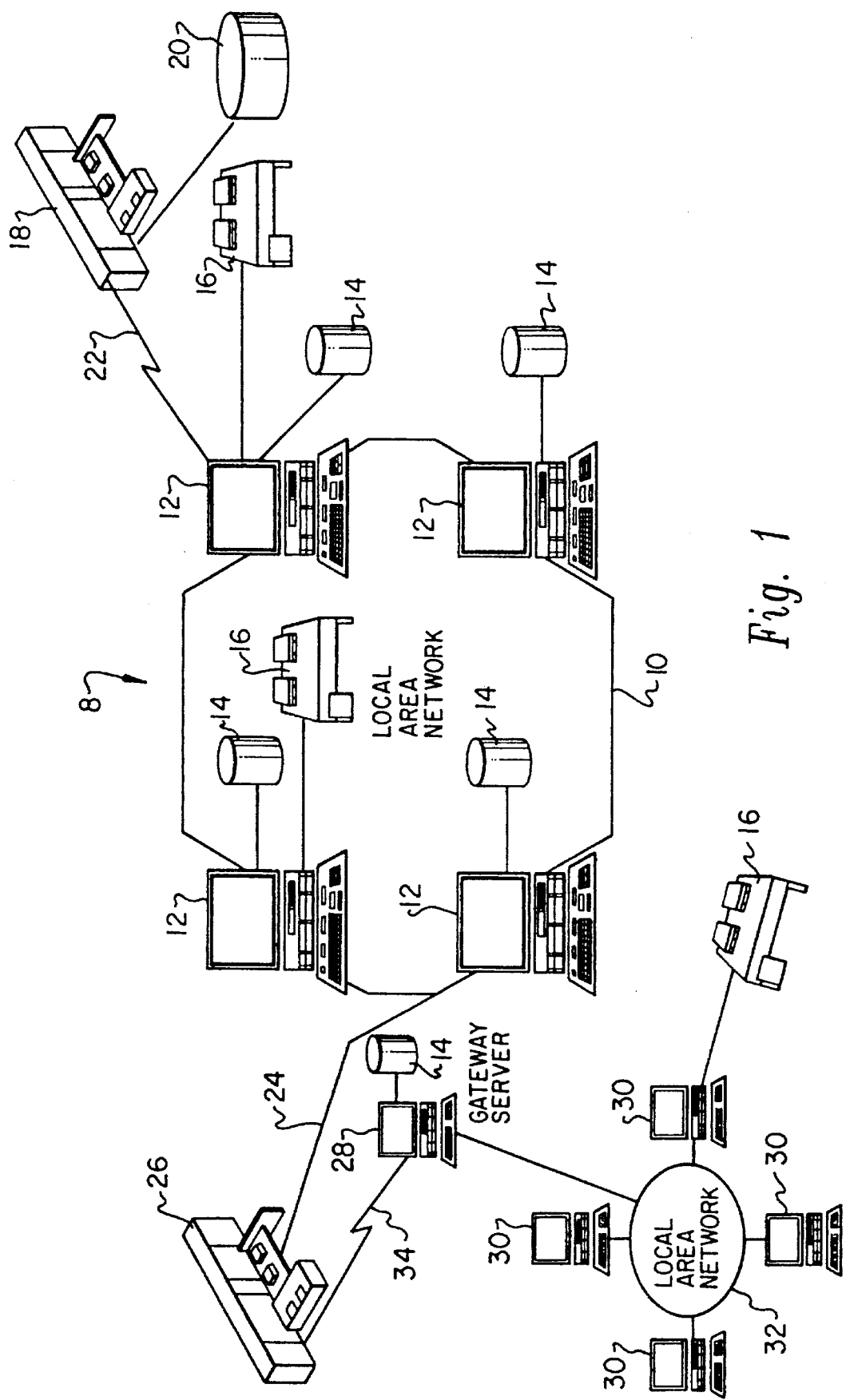
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Workstations (IWS) coupled to a host processor may be utilized for each such network.

As is common in such data processing systems, each individual computer or terminal device may be coupled to a storage device 14 and/or a printer/output device 16. One or more such storage devices 14 may be utilized, in accordance with the method and system of the present invention, to store graphic electronic mail distribution applications which may be utilized to graphically distribute electronic mail items within a data processing system in accordance with the method and system of the present invention. In a manner well known in the prior art, each graphic electronic mail distribution application may be stored within a so-called "address book" within storage device 14 and may be maintained and updated in association with an electronic mail distribution application within distributed data processing system 8.

Still referring to FIG. 1, it may be seen that distributed data processing system 8 may also include multiple mainframe computers, such as mainframe computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 8 is preferably an individual computer or Interactive Workstation (IWS) which serves to link Local Area Network (LAN) 32 to Local Area Network (LAN) 10.

As discussed above with respect to Local Area Network (LAN) 32 and Local Area Network (LAN) 10, a plurality of graphic electronic mail distribution applications may be stored within storage device 20 and controlled by mainframe computer 18. Of course, those skilled in the art will appreciate that mainframe computer 18 may be located a great geographic distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located within Texas and mainframe computer 18 may be located in New York.

In known prior art systems of this type, it is common for a user within one area of distributed data processing system 8 to transmit notes, documents or files to a user within another portion of distributed data processing system 8. This is typically accomplished by addressing the note, document or message utilizing an electronic mail distribution system wherein each user within distributed data processing system 8 has associated therewith a unique address, typically formed by a concatenation of a unique system or node address with a unique user address. However, with known distributed data processing systems the vast number of users within a distributed data processing system often requires that the addresses for each user constitute a fairly complex sequence of alphanumeric characters. It should therefore be apparent that a need exists for an intuitive graphic method for distributing electronic mail items within distributed data processing system 8.

Figure 2:
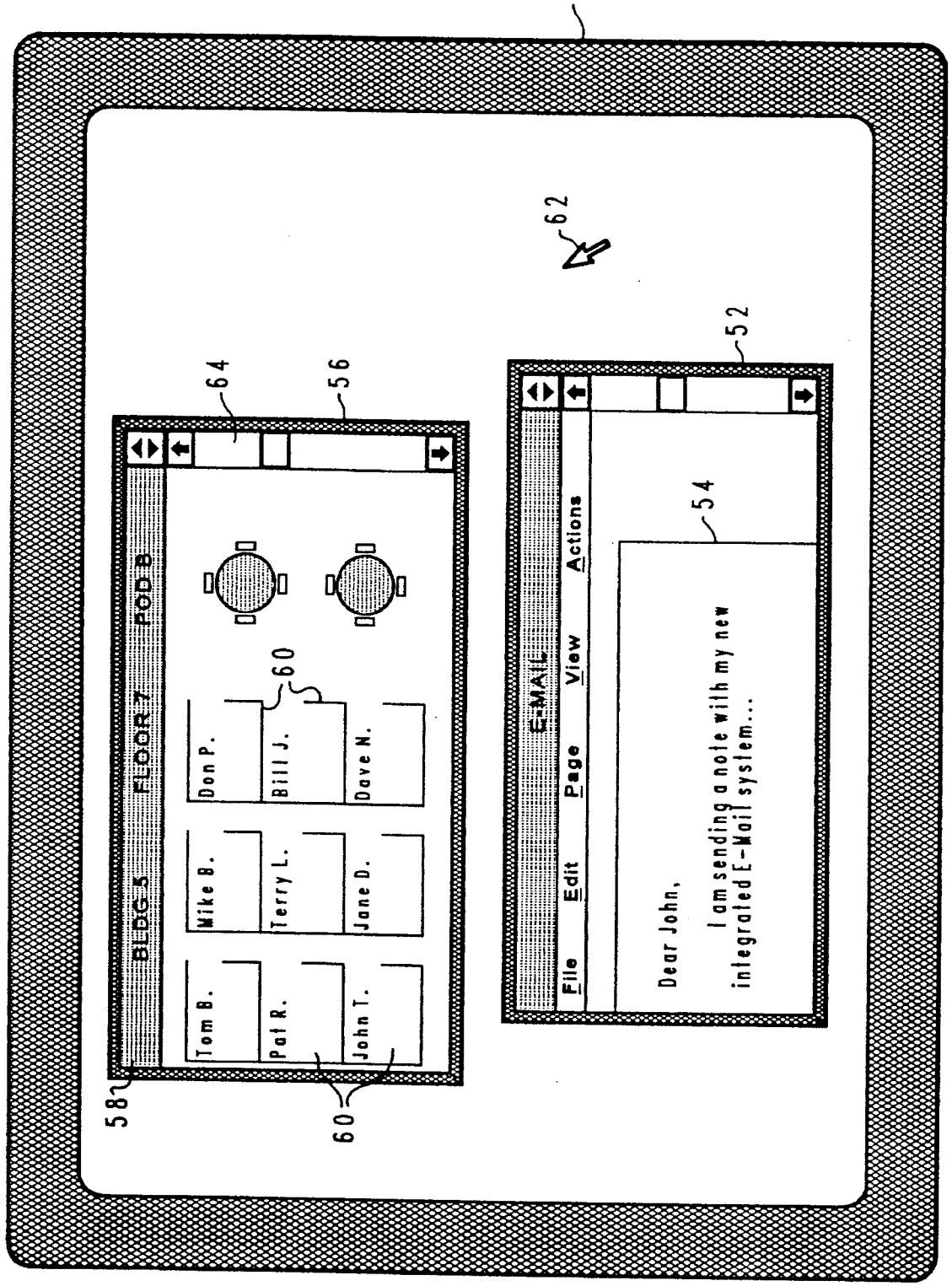
FIG. 2 is a pictorial representation of one embodiment of a graphic electronic mail distribution application provided within the distributed data processing system of FIG. 1 in accordance with the method and system of the present invention.

Referring now to FIG. 2, there is depicted a pictorial representation of one embodiment of a graphic electronic mail distribution application provided in accordance with the method and system of the present invention. As illustrated, a computer display screen 50 is depicted. Computer display screen 50 may constitute a display screen associated with any computer, workstation or terminal device within distributed data processing system, in a manner well known to those having ordinary skill in the art. Depicted within computer display screen 50 is electronic mail application 52, which is displayed within a window or viewport in a manner well known to those having ordinary skill in the graphic user interface art. Displayed within electronic mail application 52 is an electronic mail item 54 which comprises a note, message or file to be transmitted utilizing an electronic mail distribution system within distributed data processing system 8.

In accordance with an important feature of the present invention, an intuitive graphic representation of each of a plurality of unique addresses within distributed data processing system 8 is displayed within a so-called "address book" application which is displayed within window or viewport 56. As illustrated, this portion of the "address book" includes a title bar 58 which identifies a particular location. In the example depicted within FIG. 2, this portion of the address book is directed to "Building 5, Floor 7, Pod B." As depicted within window 56, a two-dimensional floor plan of nine offices 60 are graphically illustrated. Within each office the name of the individual occupying that office is also graphically depicted. A scroll bar 64 is also provided and may be utilized, in a manner well known in the art, to select alternate graphic representations of additional floor plans, or the like.

In a manner which will be explained in greater detail herein, the unique electronic mail application address for each user occupying an office depicted within window 56 has been previously identified and associated with a portion of the graphic display which is provided within window 56. Thus, electronic mail item 54 may be efficiently and graphically transmitted to a particular user within distributed data processing system 8 by graphically selecting a particular graphic representation associated with a user's address utilizing mouse pointer 62, or any other suitable graphical pointing device. In this manner, the selection of the graphic representation of "John T.'s" office 60 within window 56 will result in the distribution of electronic mail item 54 to "John T." in accordance with the method and system of the present invention. In this manner, those ordinarily skilled in the art will appreciate that intuitive graphic displays associated with selected portions of an organization served by distributed data processing system 8 may be provided to users within that system to permit the efficient, intuitive and graphic distribution of electronic mail items in the manner described with respect to FIG. 2.

Figure 3:
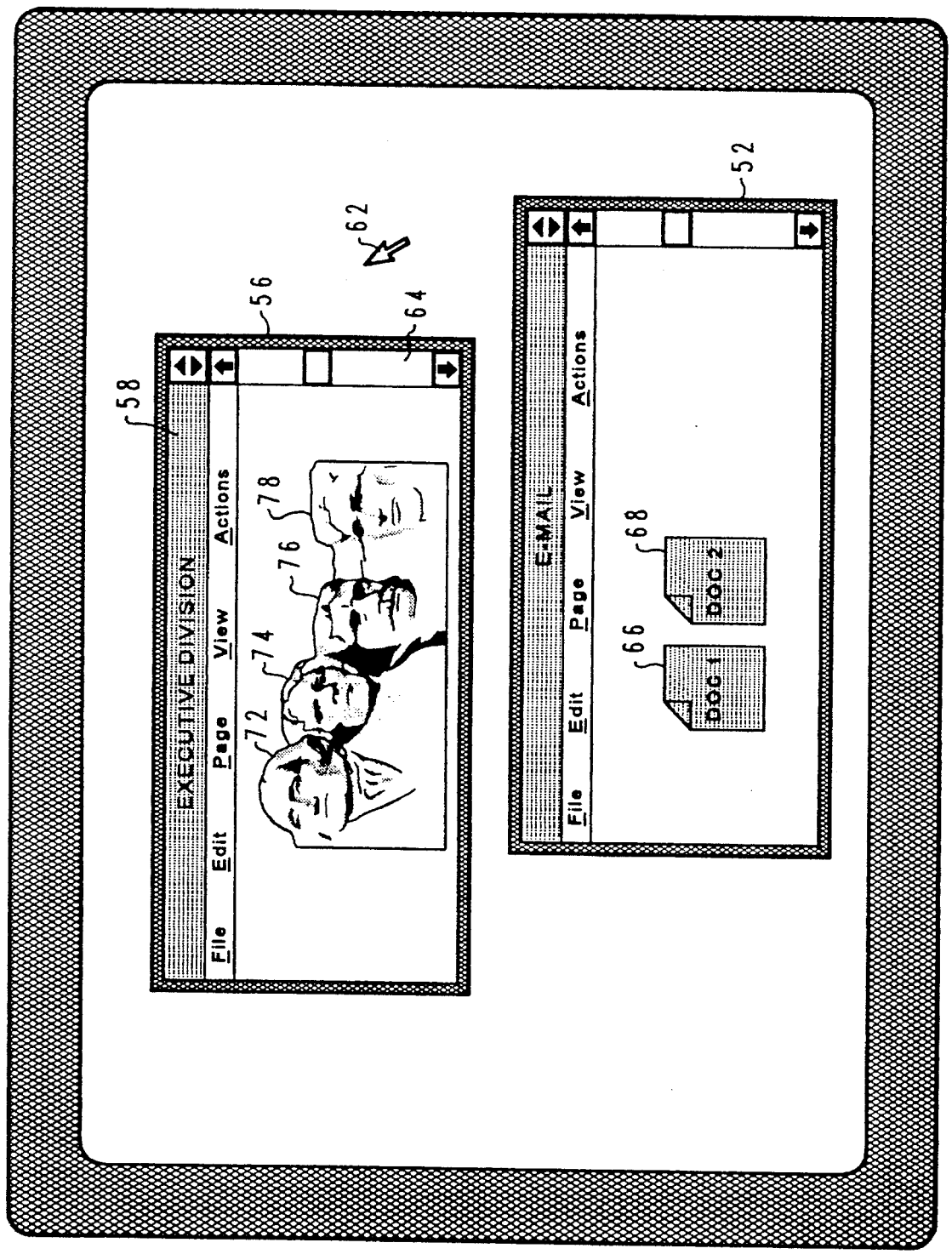
FIG. 3 is a pictorial representation of a second embodiment of a graphic electronic mail distribution application provided within the distributed data processing system of FIG. 1 in accordance with the method and system of the present invention.

Referring now to FIG. 3, there is depicted a pictorial representation of a second embodiment of a graphic electronic mail distribution application provided in accordance with the method and system of the present invention. As described above with respect to FIG. 2, a display screen 50 is illustrated which includes an electronic mail application displayed within window 52. Within window 52 multiple documents 66 and 68 are illustrated by miniature graphic representations of those documents or so-called "icons."

In contrast to the floor plan depicted within the "address book" application, as illustrated within FIG. 2, FIG. 3 depicts a pictorial representation of a group of individuals which has been stored within the address book of the user of this terminal device and identified as the "executive Division." Those skilled in the art will appreciate that many techniques exist for importing such a graphic image into the computer system and that this image may simply comprise a group photograph which has been "scanned" or otherwise imported into the data processing system.

In this manner, an electronic mail item may be distributed by permitting the user to select a graphic representation of a particular user, utilizing mouse pointer 62 in the manner described with respect to FIG. 2, or, alternatively, by selecting a particular document, such as document 66 or 68, and relocating the selected document to a point overlying a pictorial representation of a particular user utilizing so-called "drag and drop" techniques. Thus, if the user desires to distribute document 68 to user 76, that iconic representation of the document may be selected utilizing mouse pointer 62 and relocated to a point overlying the pictorial representation of user 76. A release of the document at that point will result in the automatic distribution of document 68 to user 76 without requiring the user to know or identify the unique address associated with user 76. Of course, those skilled in the art will appreciate that a particular document may be distributed to an entire group of users or to multiple users within a group utilizing simple variations of this graphic intuitive approach.

Figure 4:
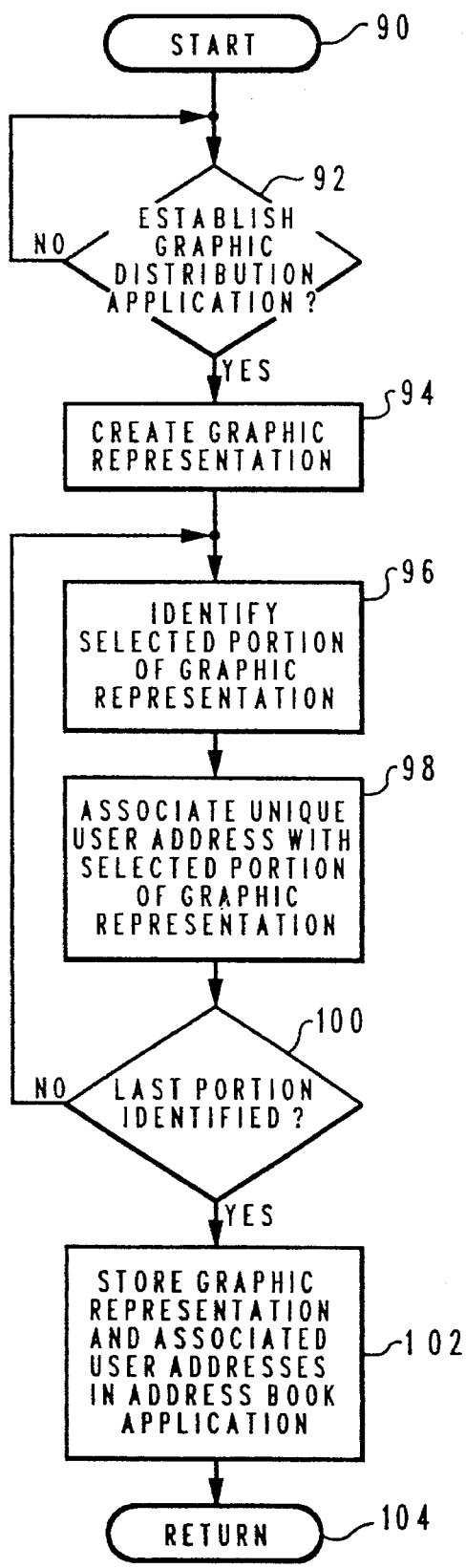
FIG. 4 is a high level logic flowchart illustrating the establishment of a graphic electronic mail distribution application in accordance with the method and system of the present invention.

Referring now to FIG. 4, there is depicted a high level flowchart which illustrates the establishment of a graphic electronic mail distribution application in accordance with the method and system of the present invention. As illustrated, this process begins at block 90 and thereafter passes to block 92. Block 92 illustrates a determination of whether or not a graphic distribution application is to be established and if not, the process merely iterates until such time as the user elects to establish a graphic distribution application.

Once a graphic distribution application is to be established, as determined at block 92, the process passes to block 94. Block 94 illustrates the creation of a graphic representation. Those skilled in the art will appreciate that the creation of a graphic representation, such as those depicted within FIGS. 2 and 3, may be accomplished by scanning in a pictorial representation of a floor plan, group photograph or other similar intuitive graphic representation which may be easily associated with the unique addresses for a particular user or group of users within distributed data processing system 8. Next, the process passes to block 96.

Block 96 illustrates an identification of selected portions within the created graphic representation. This may be accomplished by mapping an area within the graphic representation utilizing graphic pointing devices in a technique similar to those familiar with computer aided drafting or manufacturing applications. Thereafter, the process passes to block 98. Each time a selected portion of the graphic representation has been identified, the process within block 98 associates a unique user address with the selected portion of the graphic representation. Thereafter, the process passes to block 100. Block 100 illustrates a determination of whether or not the portion of a graphic representation previously identified is the last portion to be associated with a particular user address and if not, the process returns to block 96, in an iterative fashion.

Still referring to block 100, in the event the previously designated portion of the graphic representation is the last portion to be so designated, the process passes to block 102. Block 102 illustrates the storing of the graphic representation and each associated address within an "address book" application for a selected user and the process then passes to block 104 and returns.

In this manner those skilled in the art will appreciate that a user may create an address book which includes intuitive graphic representations which are associated with multiple addresses within an electronic mail distribution system and which may be utilized to graphically distribute electronic mail items in the manner set forth within the present application.

Figure 5:
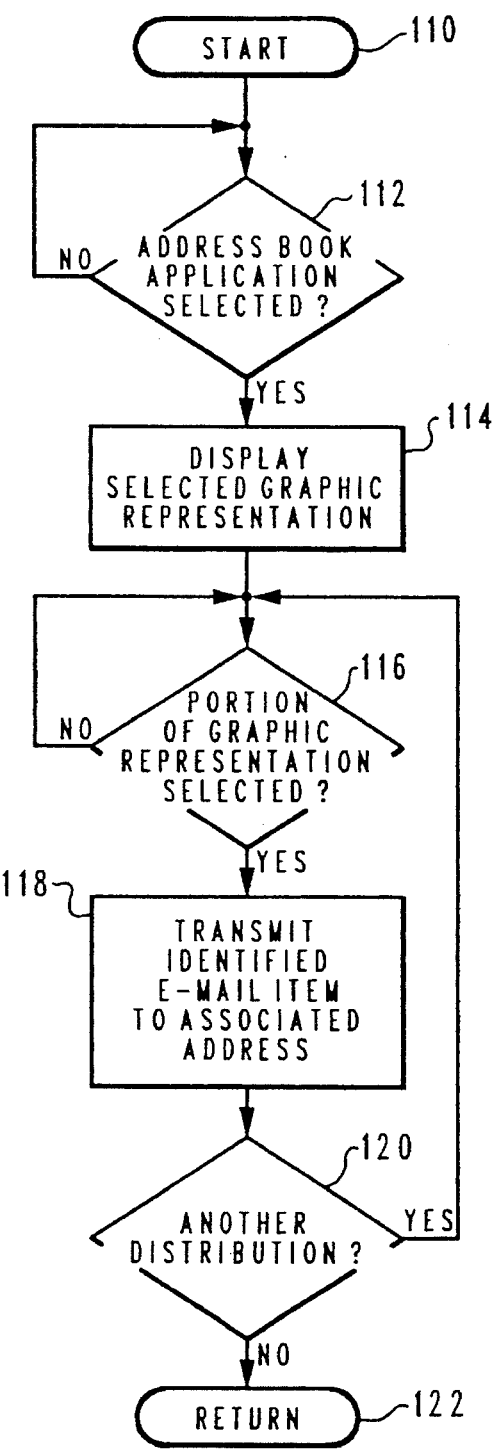
FIG. 5 is a high level logic flowchart illustrating the distribution of an electronic mail item utilizing the graphic electronic mail distribution application of the present invention.

Finally, with reference to FIG. 5, there is depicted a high level logic flowchart which illustrates the distribution of an electronic mail item utilizing the graphic electronic mail distribution application of the present invention. As above, this process begins at block 110 and thereafter passes to block 112. Block 112 illustrates a determination of whether or not the "address book" application has been selected and if not, the process merely iterates until such time as the "address book" application has been selected.

Once the "address book" application has been selected, the process passes to block 114. Block 114 illustrates the displaying of a selected graphic representation. Those skilled in the art will appreciate that a user may incorporate multiple graphic representations within an "address book" application and known techniques may be provided for permitting the user to select a particular graphic representation among those multiple representations, such as scroll bar 64. (See FIGS. 2 and 3). Thereafter, the process passes to block 116. Block 116 illustrates a determination of whether or not a portion of the graphic representation has been selected, utilizing a mouse pointer or other graphic pointing device. If not, this process merely iterates until such time as the user either closes the "address book" application, or selects a particular portion of the graphic representation.

Referring now to block 118, in the event a particular portion of a graphic representation has been selected, block 118 illustrates the transmitting of the identified electronic mail message to the address associated with the selected portion of the graphic representation. The process then passes to block 120 which illustrates a determination of whether or not a subsequent distribution of that electronic mail message is to be accomplished and if so, the process returns to block 116, in an iterative fashion. Alternately, in the event no additional distributions are to be accomplished, the process passes to block 122 and returns.

Upon reference to the foregoing those skilled in the art will appreciate that the Applicants in the present application have provided a technique whereby electronic mail items may be efficiently distributed to selected users within a distributed data processing system in an intuitive and graphic fashion which does not require the user to obtain or enter a complex user address for each intended recipient of the electronic mail item.

While the invention has been particularly shown and described with reference to a preferred embodiment, it will be understood by those skilled in the art that various changes in form and detail may be made therein without departing from the spirit and scope of the invention.

We claim:

1. A method for efficient distribution of electronic mail items within a distributed data processing system to a group of selected users, said distributed data processing system having a plurality of users enrolled therein and storing unique pictorial data and associated unique address for each of said plurality of users, said method comprising the steps of:

(a) selecting for distribution an electronic mail item from a plurality of electronic mail items within said distributed data processing system, each of said plurality of electronic mail items represented by a displayed miniature graphic representation;

(b) displaying said unique pictorial data for at least some of said plurality of users as a representative of the associated unique addresses within said data processing system, said unique pictorial data comprising a graphic representation of a physical office floor plan including office locations associated with each of a plurality of unique addresses, each office location having a user's name displayed in association therewith;

(c) graphically relocating said displayed miniature graphic representation of said selected electronic mail item to a point overlying a unique pictorial data representative of a particular one of said plurality of unique addresses;

(d) automatically distributing said selected electronic mail item to said particular one of said plurality of unique addresses by identifying a unique address associated with unique pictorial data; and (e) repeating steps (b), (c) and (d) for each user in said group of users.

2. A system for efficient distribution of electronic mail items within a distributed data processing system to a group of selected users, said distributed data processing system having a plurality of users enrolled therein and storing unique pictorial data and associated unique address for each of said plurality of users, comprising:

(a) means for selecting for distribution an electronic mail item from a plurality of electronic mail items within said distributed data processing system, each of said plurality of electronic mail items represented by a displayed miniature graphic representation;

(b) means for displaying said unique pictorial data for at least some of said plurality of users as a representative of the associated unique addresses within said data processing system, said unique pictorial data comprising a graphic representation of a physical office floor plan including office locations associated with each of a plurality of unique addresses, each office location having a user's name displayed in association therewith;

(c) means for graphically relocating said displayed miniature graphic representation of said selected electronic mail item to a point overlying a unique pictorial data representative of a particular one of said plurality of unique addresses;

(d) means for automatically distributing said selected electronic mail item to said particular one of said plurality of unique addresses by identifying a unique address associated with unique pictorial data; and (e) means for repeating steps (b), (c) and (d) for each user in said group of users.

* * * * *

UNITED STATES PATENT AND TRADEMARK OFFICE
CERTIFICATE OF CORRECTION

PATENT NO. : 5,564,018
DATED : October 8, 1996
INVENTOR(S) : Flores et al.

It is certified that error appears in the above-indentified patent and that said Letters Patent is hereby corrected as shown below:

Column 3, line 64: change "8" to --28--

Signed and Sealed this

Fourteenth Day of January, 1997

Attest:

BRUCE LEHMAN

*Attesting Officer*  *Commissioner of Patents and Trademarks*